United States Patent
Farha et al.

(10) Patent No.: US 7,204,950 B2
(45) Date of Patent: Apr. 17, 2007

(54) DISPENSING PACKAGE

(75) Inventors: Said Farha, Pleasantville, NY (US);
Sriram R. Tharmapuram, Stamford, CT (US); Nina Tarley, Monsey, NY (US)

(73) Assignee: PepsiCo, Inc., Purchase, NY (US)

( * ) Notice: Subject to any disclaimer, the term of this patent is extended or adjusted under 35 U.S.C. 154(b) by 400 days.

(21) Appl. No.: 10/741,847

(22) Filed: Dec. 19, 2003

(65) Prior Publication Data

US 2005/0133578 A1 Jun. 23, 2005

(51) Int. Cl.
*B29C 49/06* (2006.01)
*B29C 49/20* (2006.01)

(52) U.S. Cl. .............. 264/447; 264/458; 264/493; 264/513; 264/537; 264/917; 264/921

(58) Field of Classification Search .......... 264/447, 264/458, 493, 513, 537, 917, 921
See application file for complete search history.

(56) References Cited

U.S. PATENT DOCUMENTS

| | | | |
|---|---|---|---|
| 4,578,295 A | 3/1986 | Jabarin ................ 428/35 |
| 4,696,840 A | 9/1987 | McCullough et al. ....... 220/462 |
| 5,049,349 A | 9/1991 | McCullough et al. ....... 264/515 |
| 5,089,588 A | 2/1992 | White et al. ................. 528/99 |
| 5,115,075 A | 5/1992 | Brennan et al. ............. 528/99 |
| 5,134,218 A | 7/1992 | Brennan et al. ............. 528/99 |
| 5,143,998 A | 9/1992 | Brennan et al. ............. 528/99 |
| 5,149,768 A | 9/1992 | White et al. ................. 528/99 |
| 5,164,472 A | 11/1992 | White et al. ................. 528/97 |
| 5,171,820 A | 12/1992 | Mang et al. ................. 528/87 |
| 5,218,075 A | 6/1993 | Brennan et al. ............. 528/89 |
| 5,275,853 A | 1/1994 | Silvis et al. ................ 428/35.4 |
| 5,332,121 A | 7/1994 | Schmidt et al. |
| 5,482,202 A | 1/1996 | Wen ......................... 229/103.1 |
| 5,647,511 A | 7/1997 | Bond ........................ 222/105 |
| 5,749,493 A | 5/1998 | Boone et al. ............... 222/105 |
| 5,750,216 A * | 5/1998 | Horino et al. ............. 428/34.3 |
| 5,814,373 A | 9/1998 | White et al. ................. 427/386 |
| 5,915,596 A | 6/1999 | Credle, Jr. .................. 222/105 |
| 5,941,421 A | 8/1999 | Overman et al. ........... 222/105 |
| 6,045,006 A | 4/2000 | Frazier et al. .............. 222/105 |
| 6,102,252 A | 8/2000 | Overman et al. ........... 222/105 |
| 6,116,782 A | 9/2000 | Arkins et al. ............... 383/202 |
| 6,129,268 A | 10/2000 | Stahlecker ................. 229/245 |
| 6,168,041 B1 | 1/2001 | Berger et al. |
| 6,391,408 B1 | 5/2002 | Hutchinson ................ 428/35.7 |
| 6,676,883 B2 * | 1/2004 | Hutchinson et al. ........ 264/510 |
| 2003/0001315 A1 | 1/2003 | Hutchinson et al. |
| 2003/0024950 A1 | 2/2003 | Yoneyama et al. ......... 222/105 |
| 2003/0220036 A1* | 11/2003 | Lee et al. ................... 442/153 |

* cited by examiner

*Primary Examiner*—Suzanne E. McDowell
(74) *Attorney, Agent, or Firm*—Banner & Witcoff, Ltd.

(57) ABSTRACT

A seamless collapsible container has a molded finish, configured and adapted for sealing with a closure and, optionally, for attachment to a dispensing apparatus, and a seamless, blow molded body portion, comprising an inner surface, an outer surface, and a wall, where the wall is sufficiently thin to allow the body portion to collapse, and the molded finish and at least an inner layer of the body portion together comprise a seamless, single piece of thermoplastic material. The seamless collapsible container may be used in such applications as a bag-in-box, a carton liner, and a beverage pouch.

25 Claims, 9 Drawing Sheets

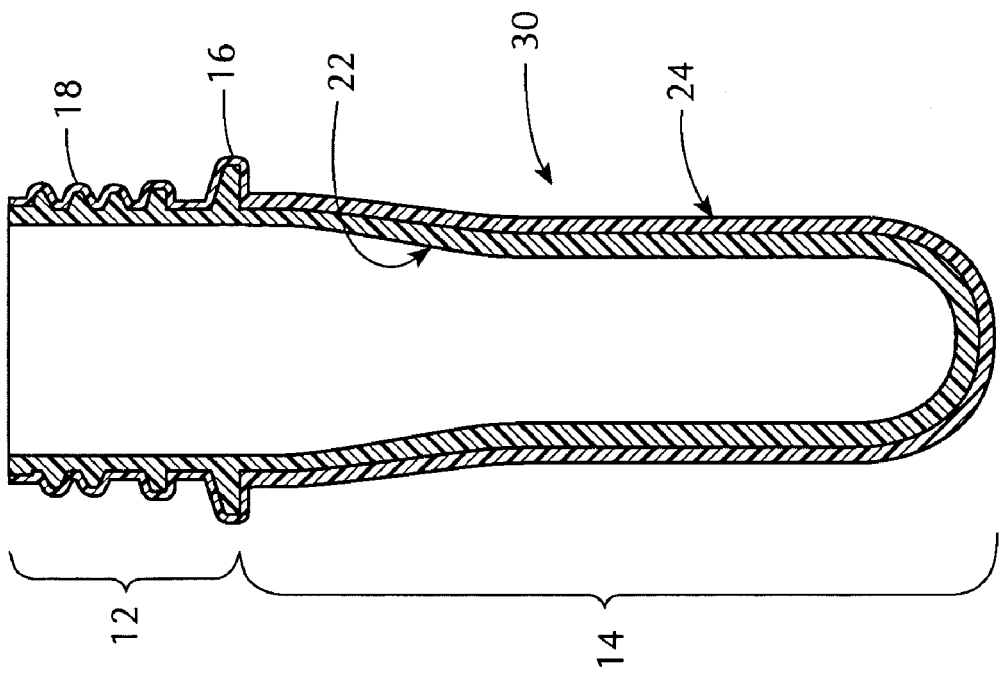
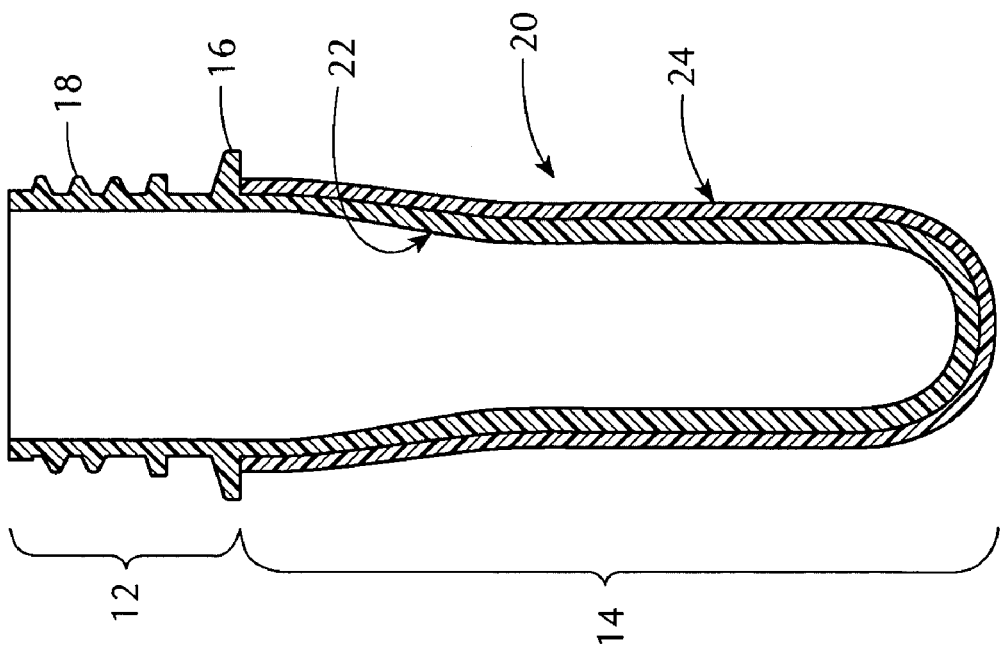

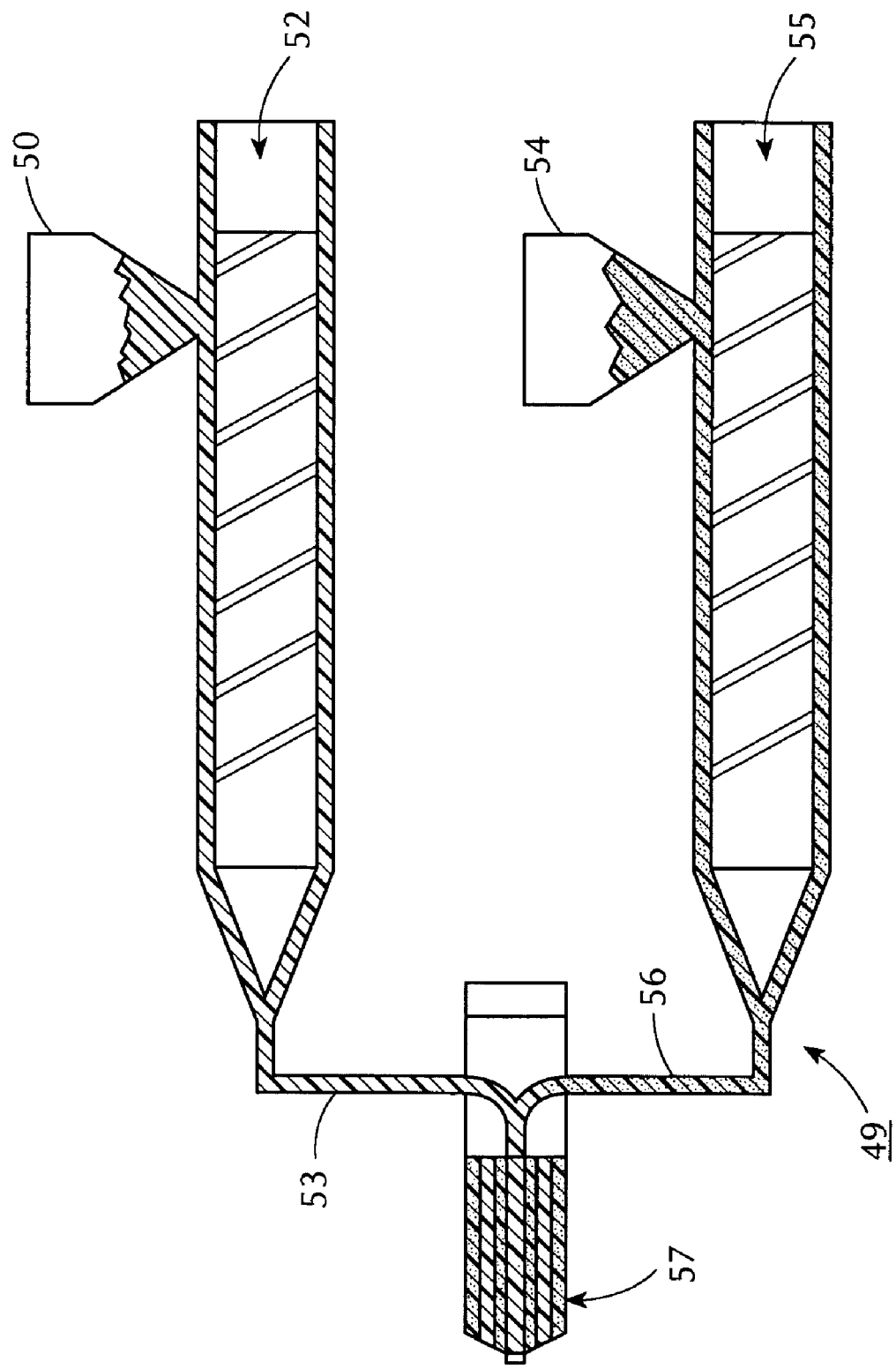

DISPENSING PACKAGE

BACKGROUND OF THE INVENTION

1. Field of the Invention

The present invention is directed to collapsible containers for packaging and dispensing fluids, particularly liquids and flowable powders. In particular, the present invention is directed to seamless thermoplastic containers for packages, such as a "bag-in-box" and beverage carton liners, and recyclable substitutes for beverage pouches and drink boxes.

2. Related Background Art

Collapsible containers are used for storing and dispensing a variety of fluids, particularly liquids and flowable powders. For example, collapsible containers are used as liners for cartons used for storing beverages and other flowable materials. In addition, collapsible containers are used in "bag-in-box" ("BIB") applications. A BIB is useful in a variety of applications. For example, relatively inexpensive wines are sold in BIBs, as are concentrates for soft drinks for fountain applications and other post-mix drink dispensers. A soft drink is provided by mixing a metered amount of concentrate from a collapsible container with a measured amount of water. As is well known in the art, the water is often carbonated.

Two particular problems exist with prior art collapsible containers. First, prior art collapsible containers are typically formed from a plurality of thermoplastic sheets that are sealed together, such as by heat sealing or with an adhesive. For example, U.S. Pat. No. 5,749,493 to Boone et al. and U.S. Pat. Nos. 5,941,421, and 6,102,252 to Overman et al. ("the Boone and Overman patents") disclose a collapsible container made from a pair of flexible sheets that are sealed together. Fluids may be introduced into and removed from the collapsible container through an annular spout disposed through one of the flexible sheets. The spout is attached to the flexible sheet and sealed using an annular flange. This results in seams, where the sheets are joined and around the spout, that are prone to leakage.

In addition, prior art collapsible containers, such as those used with soft drink fountain equipment, can form pockets when they collapse, such that the container cannot drain completely. This often results in waste, increasing the ultimate cost of the product to the consumer. Various methods of decreasing the amount of waste have been proposed. However, they all increase the complexity and cost of the collapsible container. For example, the Boone and Overman patents, discussed above, disclose a collapsible container comprising at least one elongated liquid channel that provides a path for liquid to flow from any part of the container to the container spout. The liquid channels are either one or more ribs or protrusions molded into the inner surface of a panel within the container or a web strip, having at least one pair of ribs, and disposed between the two flexible sheets that make up the opposite sides of the container. Similarly, U.S. Pat. Nos. 5,647,511, 5,915,596, and 6,045,006 to Bond, Credle, Jr., and Frazier et al., respectively, disclose collapsible container type packages having a dip strip to direct liquid in the container to the spout.

U.S. Pat. Nos. 4,696,840 and 5,049,349 to McCullough et al. disclose a bag-in-box composite container in which the inner bag of the container is blow-molded from a thermoplastic preform within the outer box, such that the outer box acts as a blow mold. There is no suggestion that the preform is stretch-blow molded to form the bag; i.e., there is no suggestion that the preform is stretched longitudinally with a stretching rod, as well as expanded by the pressure of a gas. In the disclosed method for forming the bag, an outer carton having an aperture in its top end panel is erected and placed within a restraint, such as a metal band cage or a blow mold. The body portion of the preform is heated and softened, and introduced into the erected carton through the aperture in the end panel. The top portion of the preform remains outside the box. The hot body portion of the preform is then expanded with a fluid, such as a pressurized gas or the fluid contents of the final BIB, into a thin-walled bag within the box.

There is also no teaching or suggestion in either of the McCullough patents that the walls of the disclosed bags are sufficiently thin to allow the bag to collapse as its contents are removed through the spout. Moreover, one of ordinary skill in the art would expect that, upon contact of the hot, expanded preform with the interior surface of the box, the preform and the box surface would be likely to adhere, preventing collapse of the bag when emptied. Rather than teaching that the bag is collapsible, the McCullough patents teach that, where the bag can move within the box, an adhesive can be applied to the inner surface of the box or to the outer surface of the preform prior to blow molding the preform within the box to prevent movement of the bag relative to the box. This would prevent the bag from collapsing in the box as the bag is emptied.

However, collapsible bags are highly desirable for BIBs, as such bags provide a smooth flow of fluid contents from the BIB as the bag collapses. This eliminates the need for air to enter the bag through the spout, as is required in non-collapsible bags, interfering with the flow of the contents from the bag. Therefore, a smooth flow of fluid contents from a BIB having a non-collapsible bag is not possible, as the air that must enter the bag to replace the contents of the bag must bubble through the fluid as it passes through the spout. Where the container is collapsible, no air needs to enter through the spout, as air pressure on the outside of the collapsible container reduces the volume of the container as the contents are removed, maintaining equal pressure within and without the container.

With the exception of the McCullough patents and one embodiment of the Overman patents, each of the disclosed containers requires a separate web or dip strip to channel liquid to the spout of the container, increasing the cost and complexity of the container. In addition, there is no suggestion in any of the patents discussed above of eliminating the seams between opposite sides of the containers and between the spout and the rest of the container to reduce the possibility of leakage. Also, adding a barrier layer, such as an oxygen scavenging layer requires laminating the panels and sealing multiple layers together. Again, this adds to the cost and complexity of the container.

Disposable drink boxes and beverage pouches are also well-known in the art. Typically, a drink box comprises a cardboard box, laminated with plastic, and lined with a metal foil or plastic liner that contains the beverage or drink, typically a non-carbonated juice. The drink within the drink box is typically consumed through a straw. The straw may be inserted into the drink box through a hole in the cardboard box by piercing the liner with an end of the straw. Such a drink box is generally disclosed in U.S. Pat. No. 6,129,265 to Perryman et al. Drink boxes may also comprise a built-in straw, such as that disclosed in U.S. Pat. No. 5,482,202 to Wen.

Similarly, beverage pouches typically comprise laminates of metal foil and plastic, where the edges of the foil and plastic edges are sealed to form the pouch, adding to the cost of the manufacture. As with drink boxes, a small portion of the pouch is configured to allow a straw to pierce the side of the pouch, providing access to the beverage. Such a pouch is disclosed in U.S. Pat. No. 6,116,782 to Arkins et al.

Both drink boxes and beverage pouches are intended to be disposable, and, thus, create a solid waste problem. Unlike bottles for soda and other beverages that are formed from a recyclable plastic, such as PET, laminated drink boxes and beverage pouches are difficult, if not impossible, to recycle, due to the layers of different materials that must be separated. The cost of recycling such containers can be prohibitive.

In addition, once a drink box or beverage pouch is opened, there is typically no way to re-close the container. Therefore, if all of the beverage is not consumed after opening, a potential for spilling exists. As a result, the container is often thrown away while it still contains beverage, increasing the unit cost of the beverage to the consumer, and further complicating recycling.

Therefore, a need exists for a seamless collapsible container that provides for easy and complete evacuation of the contents of BIBs and recyclable substitutes for drink boxes and beverage pouches that can preferably be resealed or closed sufficiently to be leakproof. The present invention provides such containers and methods for making such containers.

SUMMARY OF THE INVENTION

The present invention is directed to novel seamless collapsible containers and methods of making such collapsible containers that overcome the deficiencies of the prior art. The method of the invention comprises molding a thermoplastic preform, having an inner surface and an outer surface, and comprising a finish portion and a body portion, wherein the finish portion is configured and adapted for attachment to a closure for sealing the body portion and, optionally, for attachment to a dispensing apparatus. The body portion of the preform is then blow molded in a blow mold without significantly altering the finish portion to provide a seamless container having an inner surface, an outer surface, and a wall sufficiently thin for the container to be collapsible. Preferably the preform is injection molded from PET.

The method of the invention preferably further comprises forming at one least evacuation channel in a wall of the seamless collapsible container in functional communication with the finish. The evacuation channel may be formed by forming at least one groove or rib in the inner surface of the preform, such that, when the preform is blow molded, the groove or rib expands to form an evacuation channel in the inner surface of the seamless collapsible container, or by configuring the blow mold to form at least one evacuation channel in the container in functional association with the finish.

The seamless collapsible container of the invention comprises a molded finish, configured and adapted for sealing with a closure and, optionally, for attachment to a dispensing apparatus, and a seamless, blow molded body portion. The body portion comprises an inner surface, an outer surface, and a wall, where the wall is sufficiently thin to allow the body portion to collapse as it empties, and the molded finish and at least an inner layer of the body portion together comprise a seamless, single piece of thermoplastic material.

BRIEF DESCRIPTION OF THE DRAWINGS

FIG. 3 illustrates cross-section a multilayer preform useful in the invention;

FIG. 4 illustrates cross-section a multilayer preform useful in the invention in which the outer layer extends to the finish;

FIG. 6 illustrates a lamellar injection molding apparatus;

DETAILED DESCRIPTION OF THE PREFERRED EMBODIMENTS

Figure 1:
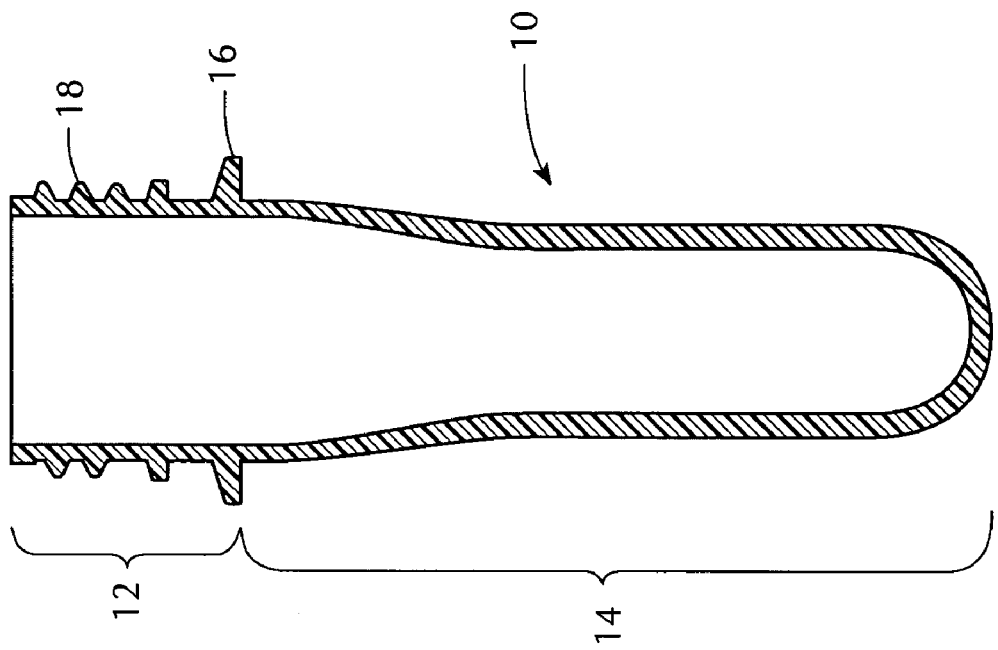
FIG. 1 illustrates a preform useful in the invention.

As used herein, the term "fluid" refers to a liquid or flowable powder. Also, as used herein, the term "seamless container" refers to container having a finish and body formed from a single piece, rather than by forming a laminate of individual sheets of material that are bonded with heat or adhesive and/or having a separate finish that is bonded or otherwise attached to the body.

As used herein, the term "collapsible container" refers to a container having walls, other than those of the neck or finish, that are substantially thinner than those of a typical prior art, carbonated beverage bottle. Where the container is made from PET, the walls of a collapsible container of the invention are typically no more than about 12 mils (0.3 mm) thick, preferably, from about 3 to about 10 mils (about 0.076 to about 0.25 mm) thick, more preferably, from about 4 to about 8 mils (about 0.1 to about 0.2 mm) thick, and, most preferably, from about 5 to about 6 mils (about 0.12 to about 0.15 mm) thick. As a result, the walls of a collapsible container in accordance with the invention are sufficiently flexible to allow at least about 90 percent and, preferably, substantially all of a fluid to flow from the container without the introduction of a gas into the container as it is evacuated, using only gravity to extract the fluid. Air pressure on the walls of a collapsible container in accordance with the invention causes the walls to collapse as the fluid is removed, decreasing the internal volume of the container by an amount substantially equal to that of fluid that flows from the collapsible container, and maintaining the pressure within the container at about that of the atmosphere outside the container.

Similarly, where the collapsible container of the invention is a beverage pouch, substantially all of the beverage may be sipped through a straw by a consumer without requiring the introduction of air into the beverage pouch, as the walls of the pouch collapse, again decreasing the internal volume of the container by an amount substantially equal to that of fluid that flows from the bottle, and maintaining equalized pressure within and without the pouch.

As will be recognized by those of ordinary skill in the art, prior art plastic bottles for carbonated beverages are not collapsible containers in accordance with the invention, as the walls of such a bottle are sufficiently thick to require the introduction of air into the bottle after only a small portion of the beverage has been poured from the bottle. For the removal of more than a few percent of the total contents of a bottle, the walls of the bottle will not deform sufficiently under normal atmospheric pressure to decrease the internal volume of the bottle by an amount substantially equal to that of fluid that flows from the bottle, and maintain substantially equal pressure inside and outside the bottle in the manner of the present invention. As a result, where a prior art bottle, filled with a beverage, is opened and inverted, air must bubble into the beverage in the bottle as the beverage flows from the bottle for any substantial portion of the beverage to flow from the bottle. In contrast, under a pressure of no more than about 1 atmosphere, a major portion of the fluid in an inverted collapsible container of the invention can be withdrawn from the container without air bubbling through the fluid, as the walls of the container deform, decreasing the internal volume of the container by an amount substantially equal to that of fluid that flows from the bottle.

The present invention is directed to seamless collapsible containers, such as a bags for a bag-in-box and recyclable substitutes for drink boxes and beverage pouches. The seamless collapsible containers of the invention are formed by blow molding a preform. The preform is preferably injection molded, but may be formed by any process known in the art of making preforms. Preforms useful in the invention preferably comprise an integral finish and a body portion. The finish is configured for sealing using a conventional closure, and, preferably, allows for a more efficient extraction of fluid from the blow molded collapsible container. Where the container is a bag-in-box, the finish is preferably attached to a dispensing station or apparatus for extraction of the fluid by a simple gravity flow. The finish, which is preferably injection molded with the body portion of the preform as a single piece, allows the use of conventional filling equipment to fill a blow-molded, seamless collapsible container of the invention. Although not typically necessary, due to the ability of the flexible walls of a collapsible container to expand the volume of a container as it is filled, tubes fitted into an evacuation device may be used to facilitate transfer into or out of the seamless container.

Where the collapsible container of the invention is a beverage pouch, the container is preferably sealed with a closure or non-spill cap. The closure may have an area that can be pierced with a straw, but, preferably, comprises a lid or cap attached to the closure by a hinge, such as a living hinge. The cap or lid may be flipped to the side, uncovering a straw hole, and flipped back into place to cover the hole. More preferably, the beverage pouch is sealed with a non-spill closure, such as that found on many sports drink containers and water bottles. Non-spill caps comprise a sliding stopper that seals the bottle in a first, lower position, and allows the beverage to be consumed directly from the container in a second, upper position. As will be understood by those of skill in the art, whatever type of closure or cap is used, some sort of tamper evident device is preferably used to readily indicate tampering, should it occur.

Particularly in collapsible containers for a bag-in-box, a blow-molded collapsible container of the invention preferably comprises molded flow channels for improved evacuation. The flow channels may be initially formed as grooves or ribs on the interior of the preform when the preform is molded using the core of the injection mold, and then expanded as channels in the blow mold. Preferably, however, the channels are formed by the blow mold during the blow-molding process.

The seamless, collapsible container is typically formed from at least one blow-moldable thermoplastic, preferably a polyester thermoplastic, and more preferably polyethylene terephthalate ("PET"), which provides a seamless, optically-clear container. Most preferably, the container is formed from PET and/or PET copolymers containing at least about 1 percent by weight of at least one of isophthalic acid ("IPA"), cyclohexane dimethanol ("CHDM"), diethylene glycol ("DEG"), naphthalene dicarboxylate ("NDC"), and other derivatives, such as polyethylene glycol. In addition, blends of PET or PET copolymers and polyethylene naphthalate ("PEN") may also be used.

The container may comprise one or more layers, where the individual layers are preferably formed on the preform before the preform is blow molded. However, once the container has been blow molded, additional layers of material can be applied to the inner or outer surface of container. Preferably, layers are formed on the preform by spraying, dipping, flow coating, flame spraying, and/or by injection molding. Typically, in applications where it may be desirable to coat the blow molded container, such as where the coating is not as flexible at the blow molding temperature as the thermoplastic used to form the preform, the coating is applied by spraying, dipping, and/or flow coating. Where the coating is applied to the preform or container by spraying, dipping, and/or flow coating, the coating is preferably cured using a source of infrared radiation ("IR").

Multilayer preforms can be formed using the inject-over-inject ("IOI") techniques disclosed in U.S. Pat. No. 6,391,408 to Hutchinson, the contents of which are incorporated herein by reference to the extent necessary to describe IOI techniques and useful materials. Inject-over-inject is a procedure using injection molding to inject one or more layers of thermoplastic material over an existing injection molded preform. Inject-over-inject may also be referred to as "over-injecting" and "overmolding." Preferably the outer layer or layers are overmolded while the preform has not yet fully solidified to facilitate bonding between the layers. As will be understood by those skilled in the art, the material used to form each layer molded onto the preform preferably has a glass transition temperature that is similar to that of the material used to form the preform, such that the layered preform does not crack, haze, or delaminate during blow molding.

A variation of inject-over-inject uses lamellar injection molding ("LIM") in which the melt stream comprises multiple thin layers of different materials. As disclosed in the Hutchinson '408 patent, LIM may be used in inject-over-inject as LIM-over-inject or inject-over-LIM. When desired, LIM-over-LIM may also be used.

Materials for additional layers that may be used in the seamless collapsible container of the invention include oxygen scavenging materials and thermoplastic resins having a low gas permeability. Oxygen scavenging materials of any type known in the art that are compatible with the thermoplastic can be used to form the preform, and can be blow molded with the preform without cracking, hazing, or delaminating.

Preferred thermoplastic resins having the requisite low permeability to gases, such as oxygen and carbon dioxide, useful in the present invention, include two types of resins. The first type, referred to herein as "copolyester barrier materials", are copolyesters of terephthalic acid, isophthalic acid, and at least one diol, such as those disclosed in U.S. Pat. No. 4,578,295 to Jabarin. The second type, referred to herein as "phenoxy-type thermoplastics," include hydroxy-functional poly(amide-ethers), such as those described in U.S. Pat. Nos. 5,089,588 and 5,143,998, poly(hydroxy amide ethers), such as those described in U.S. Pat. No. 5,134,218, polyethers, such as those described in U.S. Pat. Nos. 5,115,075 and 5,218,075, hydroxy-functional polyethers, such as those as described in U.S. Pat. No. 5,164,472, hydroxy-functional poly(ether sulfonamides), such as those described in U.S. Pat. No. 5,149,768, poly(hydroxy ester ethers), such as those described in U.S. Pat. No. 5,171,820, hydroxy-phenoxyether polymers, such as those described in U.S. Pat. No. 5,814,373, and poly(hydroxyamino ethers) ("PHAE"), such as those described in U.S. Pat. No. 5,275,853. Each of the patents referenced in this paragraph is incorporated herein by reference to the extent necessary to describe copolyester barrier materials and phenoxy-type thermoplastic materials. Other materials that may be used include, but are not limited to, recycled or post-consumer PET. Any material that comes in contact with consumable contents must, of course, be FDA approved.

Figure 2:
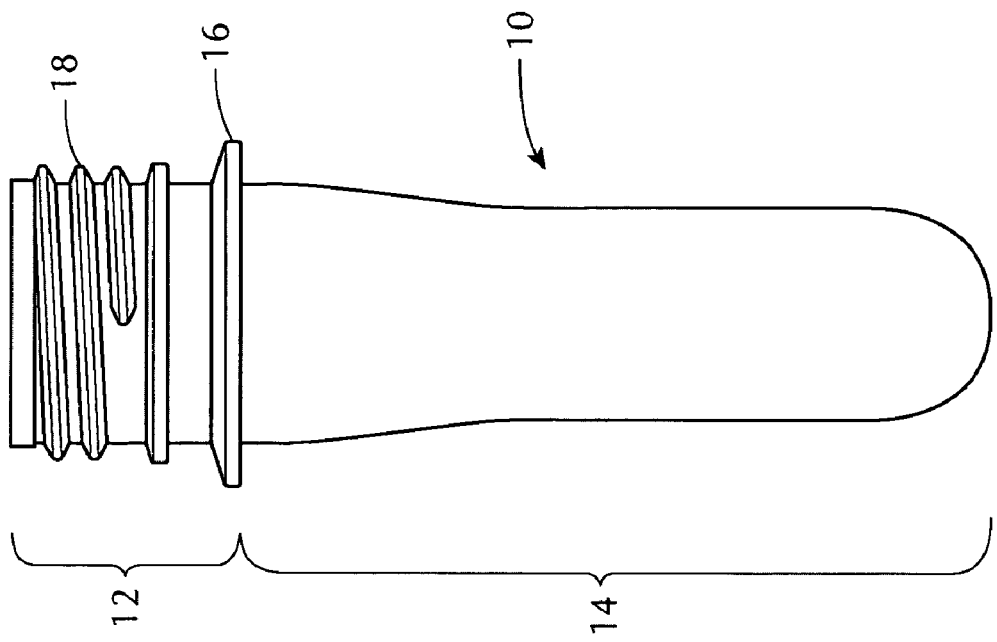
FIG. 2 illustrates a cross-section of the preform of FIG. 1.

Preforms useful in the invention may be molded using any useful molding method known in the art that will provide a seamless thermoplastic preform. Preferably, however, the preform is injection molded from PET. A preform 10 useful in the invention is illustrated in FIG. 1 and in cross-section in FIG. 2. The preform 10 comprises a finish or neck portion 12, a body or body portion 14, and a support ring 16, where the finish 12 and body 14 are seamlessly joined, and are preferably formed from as a single piece in a single blow molding operation. As illustrated, the finish 12 comprises threads 18, which, after blow molding of the body portion 14, may be used to seal the resulting container with a closure, such as those illustrated in FIGS. 11 to 13, or to attach the collapsible container to a dispensing or filling apparatus. However, configuration of the finish 12 is not limited to threads 18. Instead, any useful configuration that will allow sealing with a closure and, optionally, an attachment to a dispensing or filling apparatus, such as a bayonet mount or compression fitting, may be used.

A cross-section of a multilayer preform 20 useful in the invention is illustrated in FIG. 3. As with the preform 10 illustrated in FIGS. 1 and 2, the multilayer preform 20 comprises a seamlessly joined finish 12 and body portion 14 and a support ring 16. The body portion 14 comprises an inner layer 22, seamlessly joined to, and, preferably, molded in a single piece with the finish 12, and at least one outer layer 24. Preferably, the outer layer 24 is formed from a thermoplastic material that will stretch with the inner layer 22 during blow molding without cracking, hazing, or delaminating. The outer layer 24 may also extend to the finish 12, as shown for the preform 30 illustrated in FIG. 4.

Figure 5:
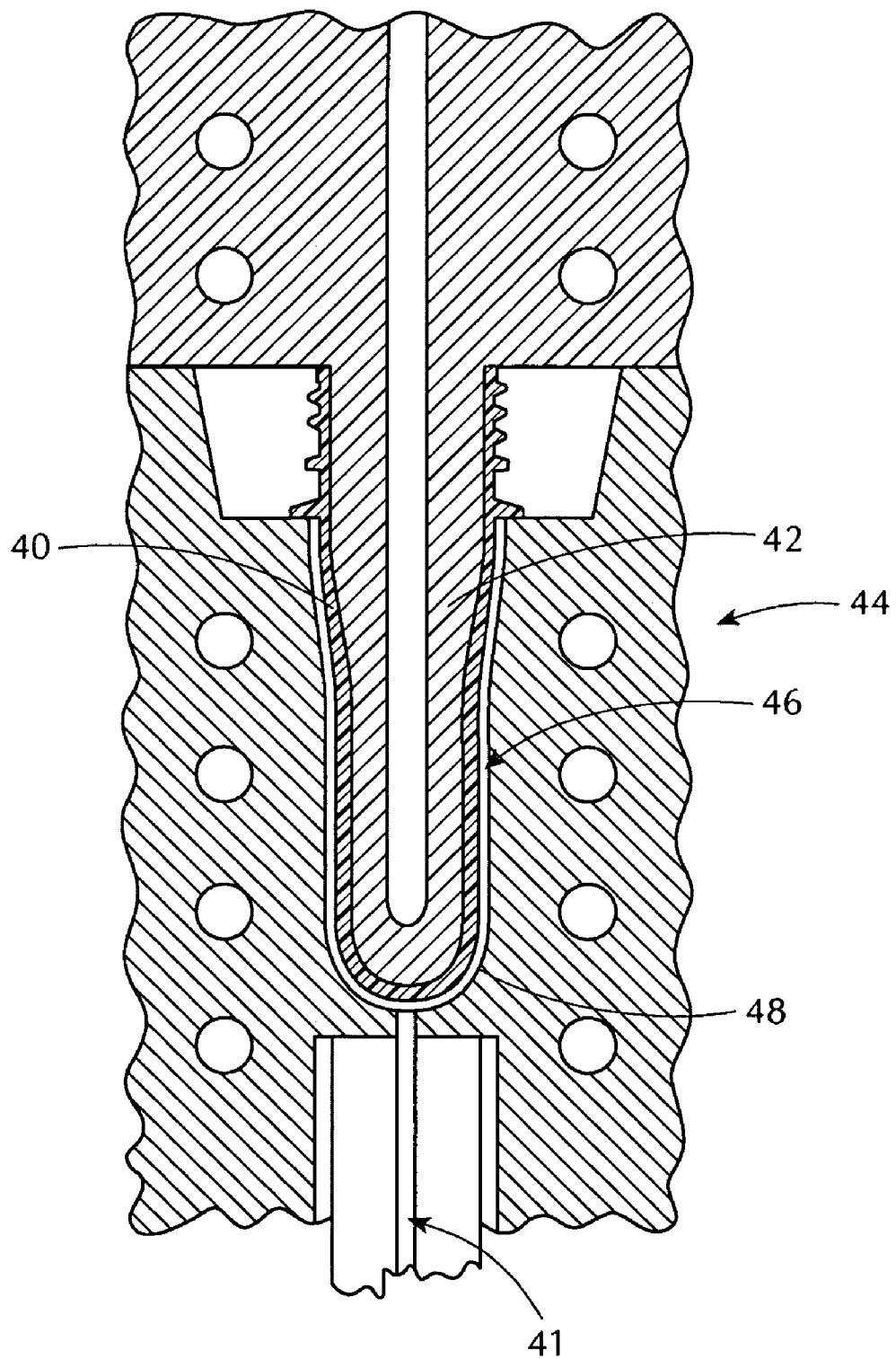
FIG. 5 illustrates an inject-over-inject molding apparatus.

The outer layer 24 may be formed using any useful method known in the art, such as dip, spray, or flow coating, injection molding, or flame spraying. Preferably, the preform is molded using inject-over-inject, as illustrated in FIG. 5. Using the inject-over-inject process, a preform 40 is injection molded on a core 42 in a first mold (not shown), where the core 42 and first mold are both preferably cooled. The preform 40 and core 42 are then transferred to a second cooled mold 44. At least one layer of thermoplastic resin is then injection molded through gate 41 onto the outer surface 46 of the preform 40 in the gap 48 formed between the outer surface 46 and the second mold 44. After cooling, a multilayer preform of the type illustrated in FIG. 3 is obtained.

As noted above, multilayer preforms may also be molded using a lamellar injection molding system that is useful for LIM-over-inject, inject-over-LIM, or LIM-over-LIM molding. A lamellar injection molding apparatus 49 is illustrated in FIG. 6. Although the apparatus 49 is suitable for LIM-over-inject, inject-over-LIM molding, and LIM-over-LIM molding, an entire preform may be made using a single LIM molding step. The apparatus 49 comprises a feed hopper 50, configured to supply a first thermoplastic resin, preferably PET, to a first injection cylinder 52, and a second feed hopper 54, configured to supply a second thermoplastic resin, such as a barrier material, to a second injection cylinder 55. The outputs 53 and 56, respectively, are combined in a layer generator 57 in the desired relative amounts, and used to form at least one portion of a preform (not shown).

Figure 7:
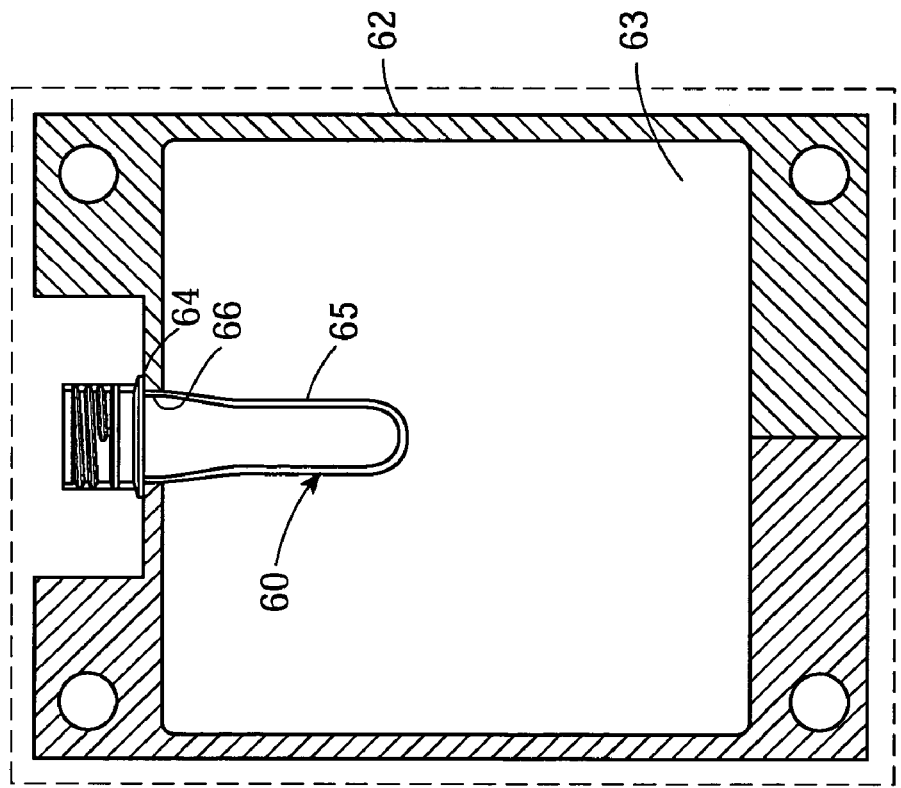
FIG. 7 illustrates a blow molding process.

As illustrated in FIG. 7, a seamless preform 60, formed by any molding method known in the art is inserted into a blow mold 62 with a cavity 63 having the shape of the final container, and supported in the mold 62 by the support ring 64 for blow molding, such that the body portion 65 of the preform 60 is within the mold cavity 63, and the neck finish 66 is outside the mold 62. The preform 60 may be introduced into the blow mold 62 immediately after molding, or may be stored until needed. Preferably, the preform 60 is blow molded immediately after molding because the preform 60 will then still retain heat form the initial molding process, and the amount of additional heating is thus reduced. The seamless collapsible container of the invention is then molded using conventional blow molding techniques, including, but not limited to, stretch blow molding.

Figure 8:
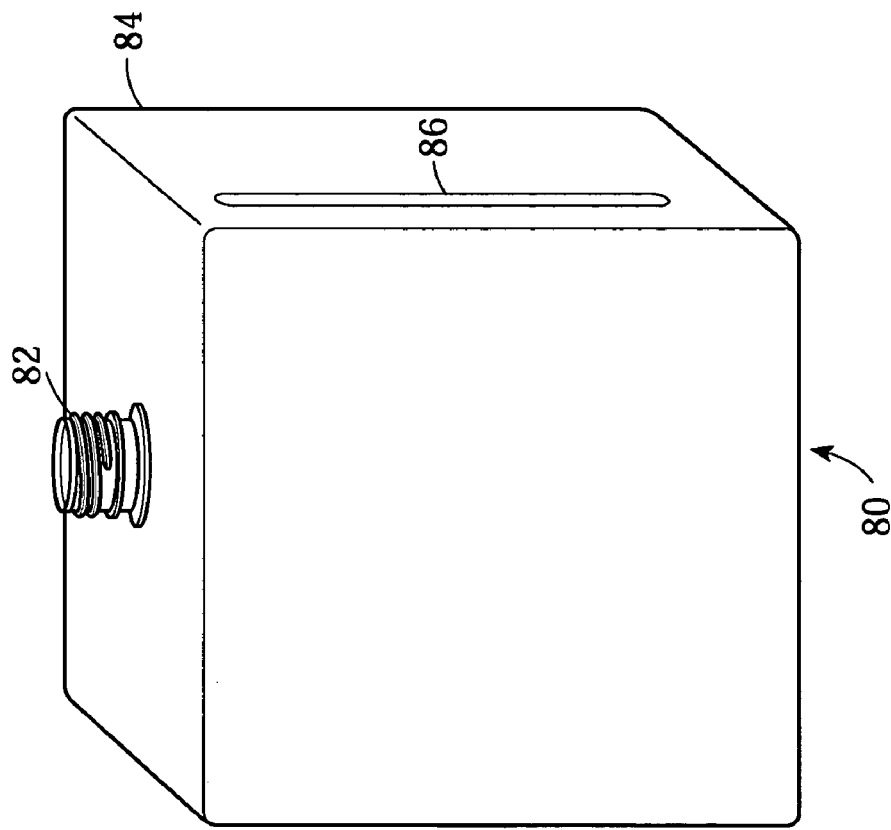
FIG. 8 illustrates a seamless collapsible container of the invention.

As discussed above, where the seamless collapsible container of the invention is a bag for a BIB, the container preferably comprises at least one evacuation channel to improve the dispensing of contents. The blow mold 62 is, thus, preferably configured with at least one channel mold for forming evacuation channels in the container. A seamless collapsible container 80 is illustrated in FIG. 8. Although the container 80 is illustrated as having a generally rectangular shape, seamless collapsible containers in accordance with the invention may have any useful shape, such as cylindrical, spherical, and the like. The container 80 comprises a finish 82 seamlessly attached to a body portion 84. As discussed above, the finish 82 and body portion 84 are preferably molded of a single piece. However, as will be recognized by those skilled in the art, the finish and body portion of the preform used to form the container 80 may be molded separately, and then joined by any means known in the art that will provide a preform that is free of seams. Preferably, the container 80 also comprises at least one evacuation channel 86.

Figure 9:
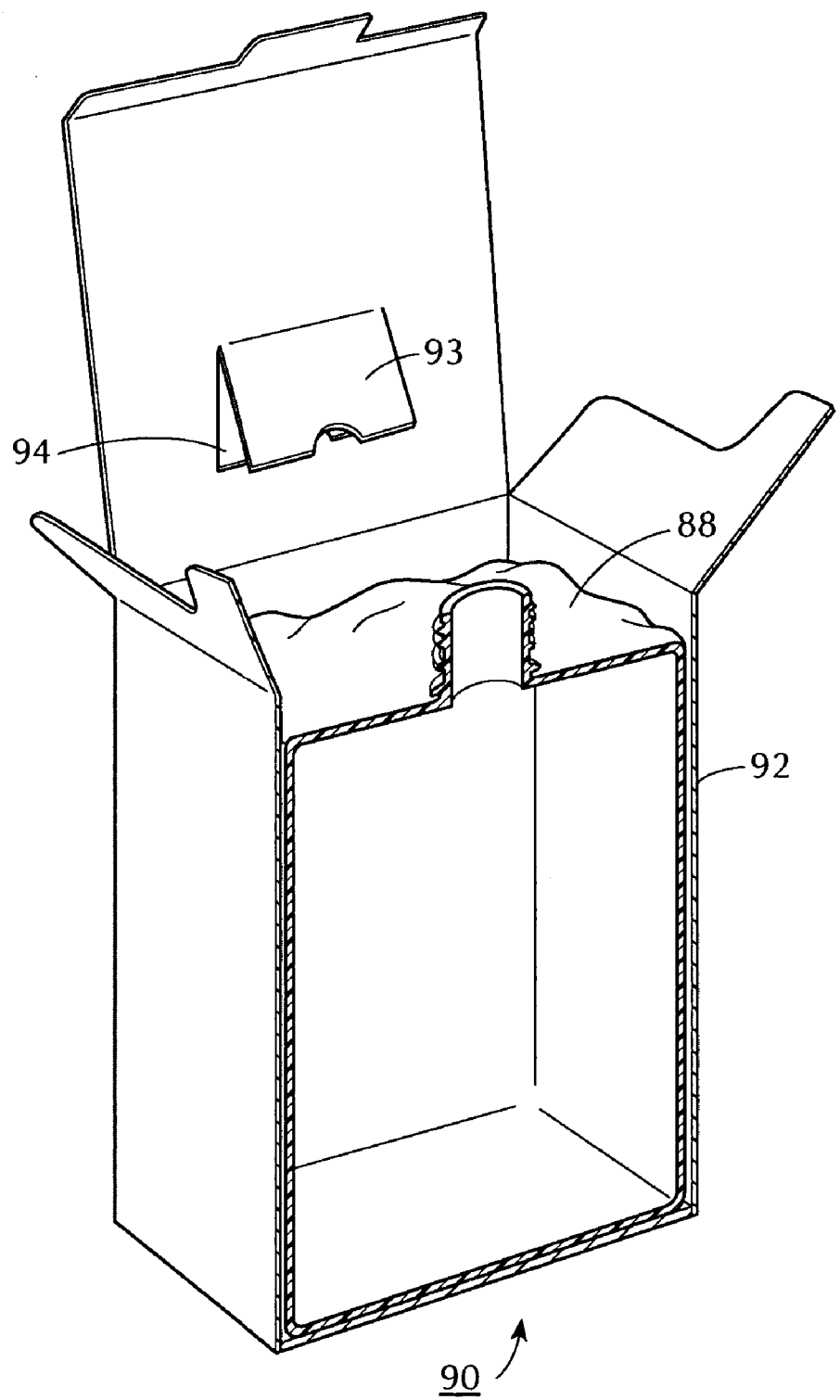
FIG. 9 illustrates a cross-section of a bag-in-box incorporating a seamless collapsible container of the invention.

As illustrated in cross-section in FIG. 9, the container 80 is used as the bag 88 in a bag-in-box 90, which further comprises a box 92. The box may be folded around the bag 88, or the bag 88 may be inserted through an opening in the box 92, which may be sealed with a flap. Preferably, the box 92 comprises a spout opening 94 for access to the finish 82, which may also be used to insert the bag 88 into the box 92. For shipping, the opening 94 is closed by a panel 93 that is removed for attachment of the finish to a dispensing apparatus.

Figure 10:
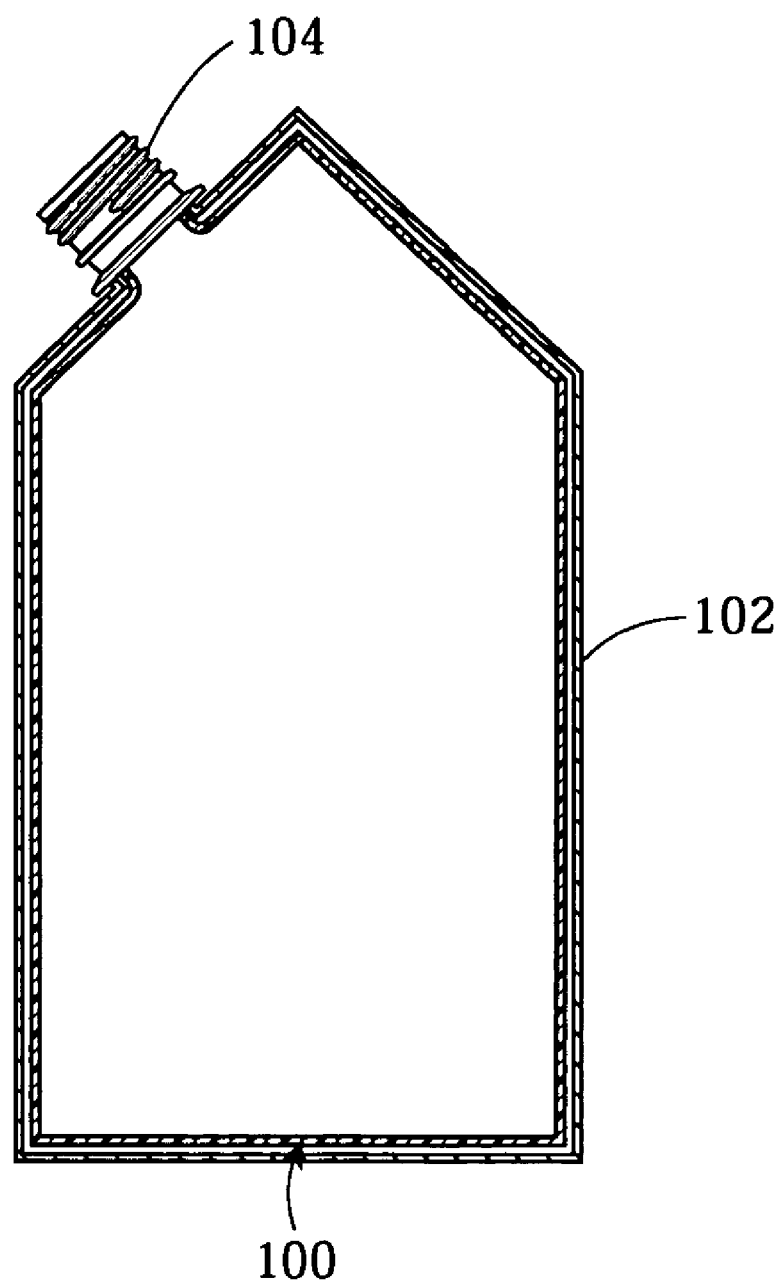
FIG. 10 illustrates a cross-section of a carton incorporating a seamless collapsible container of the invention.

A container 100 in accordance with the invention may also be used as a liner for a carton 102, such as that used for juices and other beverages, as illustrated in cross-section in FIG. 10. The container 100 is inserted into the carton 102, with the finish 104 positioned at the top where it functions as a spout.

Figure 12:
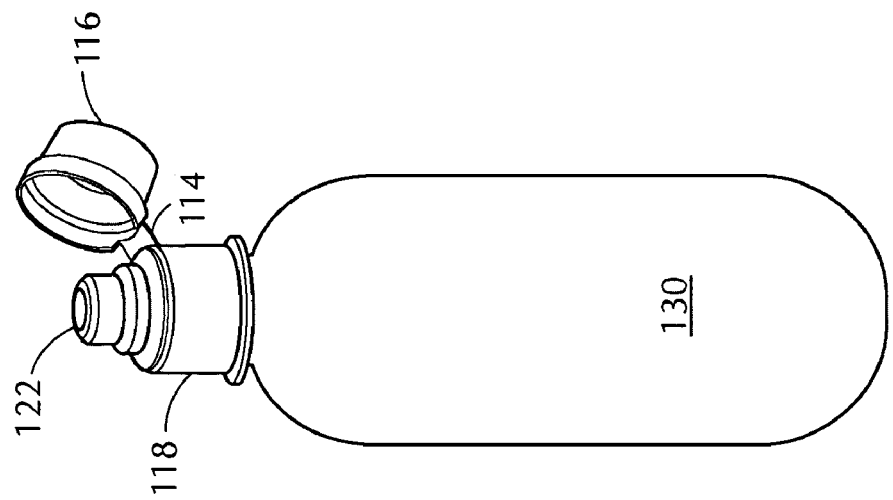
FIG. 12 illustrates a beverage pouch of the invention with a flip-top cap in the open position.
Figure 11:
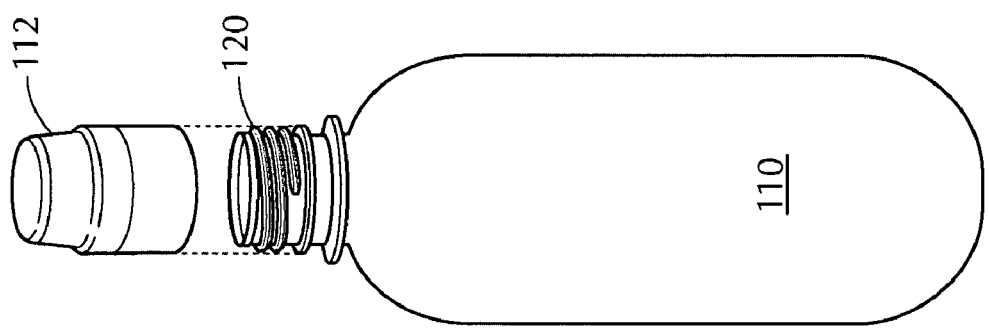
FIG. 11 illustrates a beverage pouch of the invention with a flip-top cap in the closed position.

A beverage pouch 110 of the invention, having a closure 112, preferably attached to the pouch 110 with a flexible or "living" hinge 114 is illustrated in FIGS. 11 and 12, where FIG. 11 is an exploded view. The closure 112 may comprise a flip-top 116 attached to a base 118 that is configured for sealing the pouch 110. Preferably, the closure base 118 and the neck finish 120 of the pouch are compatibly threaded. In FIG. 11, the closure 112 is illustrated in the closed position, and in FIG. 12, the closure 112 is in the open position. The base 118 defines a straw opening 122 that is covered and sealed to prevent leakage when the flip-top 116 is closed.

Figure 13:
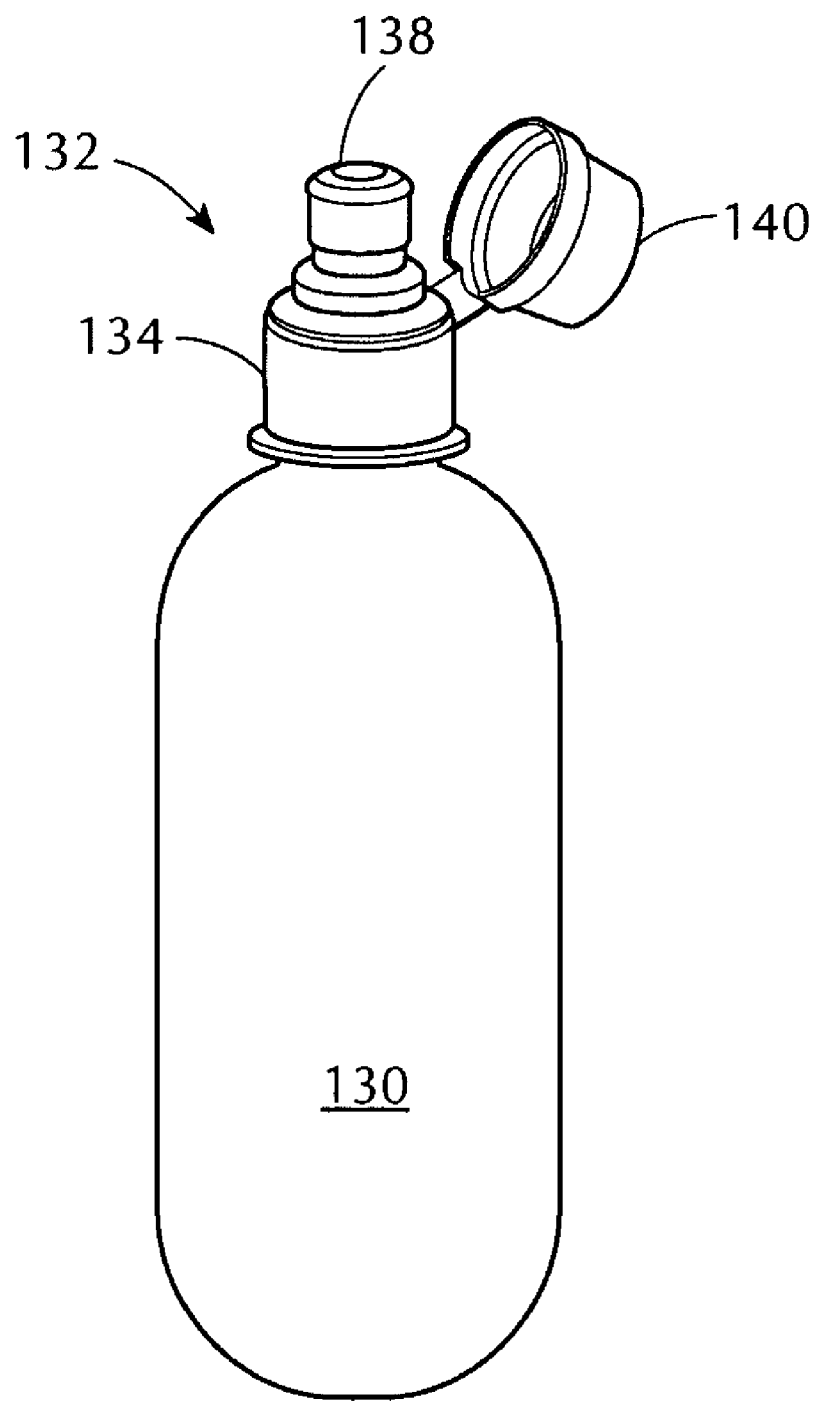
FIG. 13 illustrates a beverage pouch of the invention with a non-spill cap.

A beverage pouch 130 of the invention, having a non-spill cap 132 is illustrated in FIG. 13. The cap 132 comprises a base 134, configured to cover the neck finish of the pouch, which may be of any type known in the art, such as the neck finish 120 illustrated in FIG. 11, and a movable stopper 138 that is configured to seal the cap when pushed down toward the base 134, and to allow the beverage within the pouch 130 to be consumed when pulled to an upper position. Such non-spill caps are well-known in the art. The cap 132 may further comprise a cap cover 140.

Accordingly, it will be appreciated that the present invention has been described with references to particular preferred embodiments that are now contemplated. However, the invention is not limited by the embodiments disclosed herein, and it will be appreciated that numerous modifications and other embodiments may be devised by those skilled in the art. Therefore, it is intended that the appended claims cover all such modifications and embodiments that fall within the true spirit and scope of the present invention.

What is claimed:

1. A method of making a seamless collapsible container, the method comprising:
   obtaining a thermoplastic preform, having an inner surface and an outer surface, and comprising a finish portion and a body portion, wherein the finish portion is configured and adapted for attachment to a closure for sealing the body portion and, optionally, for attachment to a dispensing apparatus; and
   blow molding the body portion of the preform in a blow mold without significantly altering the finish portion to provide a seamless container having an inner surface, an outer surface, and a wall sufficiently thin for the container to be collapsible.

2. The method according to claim 1, wherein the thermoplastic material comprises at least one aromatic polyester.

3. The method according to claim 1, wherein the thermoplastic material comprises PET.

4. The method according to claim 1, further comprising molding a thermoplastic material to obtain the preform.

5. The method according to claim 4, wherein the preform molding step comprises injection molding.

6. The method according to claim 5, wherein the preform molding step comprises at least one of LIM-over-inject molding, inject-over-LIM molding, and LIM-over-LIM molding.

7. The method according to claim 6, wherein at least one inject step comprises molding a layer of recycled or post-consumer PET onto the preform.

8. The method according to claim 4, wherein the preform molding step comprises an inject-over-inject molding technique, having first and second injection steps.

9. The method according to claim 8, wherein the second injection step comprises molding a layer of post consumer PET onto the preform.

10. The method according to claim 4, wherein the preform molding step comprises forming at least one groove in the inner surface of the preform, such that, when the preform is blow molded, the groove expands to form an evacuation channel in the inner surface of the seamless collapsible container.

11. The method according to claim 1, further comprising coating the preform with at least one thermoplastic material.

12. The method according to claim 11, wherein the coating step comprises coating the preform with a layer comprising at least one of a phenoxy-type compound and a copolyester barrier material.

13. The method according to claim 12, wherein the phenoxy-type compound is a poly(hydroxyamino ether).

14. The method according to claim 11, wherein the coating step comprises at least one of dip coating, spray coating, and flow coating a coating onto the preform.

15. The method according to claim 14, further comprising curing the coating with an IR source.

16. The method according to claim 1, further comprising injection molding at least one layer of thermoplastic onto the preform.

17. The method according to claim 16, wherein the layer comprises post consumer PET.

18. The method according to claim 1, wherein the blow molding step comprises forming at least one evacuation channel in the container in functional association with the finish.

19. The method according to claim 1, further comprising positioning the blow molded container in a box, thereby forming a bag-in-box.

20. The method according to claim 1, further comprising applying a coating of at least one barrier material to the outer surface of the blow molded container.

21. The method according to claim 20, wherein the coating step comprises coating the preform with a layer comprising at least one of a phenoxy-type compound and a copolyester barrier material.

22. The method according to claim 21, wherein the phenoxy-type compound is a poly(hydroxyamino ether).

23. The method according to claim 20, wherein the coating step comprises at least one of dip coating, spray coating, and flow coating a coating onto the preform.

24. The method according to claim 20, further comprising curing the coating with infra-red radiation.

25. The method according to claim 1, further comprising attaching a closure to the finish to provide a beverage pouch, wherein the closure is configured to accept a straw, or is a non-spill cap, comprising a sliding stopper that seals the bottle in a first, lower position, and allows the beverage to be consumed directly from the container in a second, upper position.

* * * * *